ást
United States Patent
Kim et al.

(10) Patent No.: US 10,050,315 B2
(45) Date of Patent: Aug. 14, 2018

(54) BATTERY MODULE WITH FUSIBLE CONDUCTORS

(71) Applicant: SAMSUNG SDI CO., LTD., Yongin-si, Gyeonggi-do (KR)

(72) Inventors: Sukkyum Kim, Yongin-si (KR); Byungdon Kwon, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 528 days.

(21) Appl. No.: 14/670,756

(22) Filed: Mar. 27, 2015

(65) Prior Publication Data

US 2016/0111757 A1    Apr. 21, 2016

(30) Foreign Application Priority Data

Oct. 20, 2014    (KR) .................. 10-2014-0141699

(51) Int. Cl.

| H01M 2/30 | (2006.01) |
|---|---|
| H01M 10/42 | (2006.01) |
| H01M 10/48 | (2006.01) |
| H01M 2/34 | (2006.01) |
| H01M 10/0525 | (2010.01) |
| H01M 2/12 | (2006.01) |
| H01M 2/20 | (2006.01) |

(52) U.S. Cl.
CPC ..... *H01M 10/4257* (2013.01); *H01M 2/1241* (2013.01); *H01M 2/202* (2013.01); *H01M 2/30* (2013.01); *H01M 2/345* (2013.01); *H01M 10/0525* (2013.01); *H01M 10/482* (2013.01); *H01M 2200/20* (2013.01)

(58) Field of Classification Search
None
See application file for complete search history.

(56) References Cited

U.S. PATENT DOCUMENTS

| 2008/0309288 A1 | 12/2008 | Benckenstein et al. |
| 2012/0237803 A1* | 9/2012 | Mardall ............... B60L 3/0046 |
| | | 429/53 |
| 2013/0200700 A1 | 8/2013 | Ohkura et al. |

FOREIGN PATENT DOCUMENTS

| KR | 10-2011-0008337 | 1/2011 |
| KR | 10-2013-0021801 A | 3/2013 |
| KR | 10-2014-0027751 A | 3/2014 |
| WO | WO-2011/105095 A1 | 9/2011 |

* cited by examiner

*Primary Examiner* — Tracy M Dove
(74) *Attorney, Agent, or Firm* — Lee & Morse, P.C.

(57) ABSTRACT

A battery module including at least one battery cell, a shunt resistor above a safety vent of the battery cell, and a plurality of fusible conductors connecting the shunt resistor to a charging/discharging current path. The shunt resistor measures a charging/discharging current of the battery cell. The fusible conductors include a material which melts when heated by a gas discharged through the safety vent.

11 Claims, 3 Drawing Sheets

BATTERY MODULE WITH FUSIBLE CONDUCTORS

CROSS-REFERENCE TO RELATED APPLICATION

Korean Patent Application No. 10-2014-0141699, filed on Oct. 20, 2014, and entitled, "Battery Module," is incorporated by reference herein in its entirety.

BACKGROUND

1. Field

One or more embodiments described herein relate to a battery module.

2. Description of the Related Art

Various gases (e.g., $CO_2$ and $H_2$) are generated in secondary batteries due to reactions between active materials and electrolytes. When an empty space is formed in a battery due to the formation of gas, inactive regions may be formed on active materials or the movement of lithium (Li) ions in an electrolyte may be obstructed. As a result, the lifespan of the battery may be shortened. Also, when gas accumulates in the battery, the battery may swell, thereby increasing the internal pressure of the battery. Thus, an explosion may occur.

In an attempt to prevent effects, the gas generated in a battery may be externally discharged and bubbles formed in an internal electrolyte solution may be removed. This may allow active materials to function properly. As a result, the safety and lifespan of the battery may be improved.

High-capacity, high-power battery modules have been formed by electrically connecting a plurality of battery cells. In one type of battery module, the battery cells are closely arranged. As a result, when a battery cell deteriorates or gas is generated, neighboring battery cells may deteriorate and/or the safety of the battery module may be markedly reduced, for example, because of thermal runaway. Thus, the occurrence of negligent accidents becomes a possibility.

SUMMARY

In accordance with one or more embodiments, a battery module including at least one battery cell; a shunt resistor above a safety vent of the battery cell, the shunt resistor to measure a charging/discharging current of the battery cell; and a plurality of fusible conductors connecting the shunt resistor to a charging/discharging current path, the fusible conductors including a material which melts when heated by a gas discharged through the safety vent.

The battery module may include a protective circuit between the battery cell and the shunt resistor. The battery module may include a conductive pattern on the protective circuit and including the charging/discharging current path, and the fusible conductors connect the shunt resistor to the conductive pattern. The protective circuit may include a circuit board including an opening, wherein the shunt resistor directly faces the safety vent through the opening. The fusible conductors may be located around the opening.

The battery module may include first and second battery cells the first and second battery cells include first and second output terminals having opposite polarities, and a connection wiring is connected to the protective circuit to conduct a charging/discharging current from the first or second output terminal. The connection wiring may include a protrusion integrally protruding from the first or second output terminal toward the protective circuit.

The detection wiring may be connected to the protective circuit for collecting a voltage detection signal from the battery cell. The detection wiring may extend from a bus bar electrically connecting a plurality of battery cells. The detection wiring may include a protrusion integrally protruding from the bus bar toward the protective circuit. The fusible conductors may include solder.

In accordance with one or more other embodiments, a battery module includes at least one battery cell; a sensor to measure a current of the battery cell; a circuit breaker connected between the sensor and a current path, wherein the current of the battery cell flows through the current path and wherein the circuit breaker disrupts the current path when pressure inside the battery cell exceeds a predetermined level.

The circuit breaker may include a conductor, and the conductor may include a material which melts when heated. The at least one battery cell may include a vent, the vent may release heated gas when the pressure inside the battery cell exceeds the predetermined level, and the conductor may melt by the heated gas to disrupt the current path. The sensor may include a resistor.

The battery module may include a circuit board between the vent and the sensor, wherein the circuit board includes a hole and wherein the circuit breaker is adjacent the hole to receive the heated gas. The current may be a discharge current or a charging current. The battery module may include a plurality of battery cells, and at least one spacer to separate adjacent ones of the battery cells by a predetermined distance. The circuit breaker may be between terminals of the at least one battery cell.

In accordance with one or more other embodiments, a battery cell includes a vent; terminals; a sensor to measure a current between the terminals; and a circuit breaker connected between the sensor and a current path, wherein the current of the battery cell flows through the current path and wherein the circuit breaker includes a conductor which is to melt when heated gas is released from the vent, the heated gas to be released from the vent when pressure inside the battery cell exceeds a predetermined level, the melting of the conductor to disrupt the current path.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
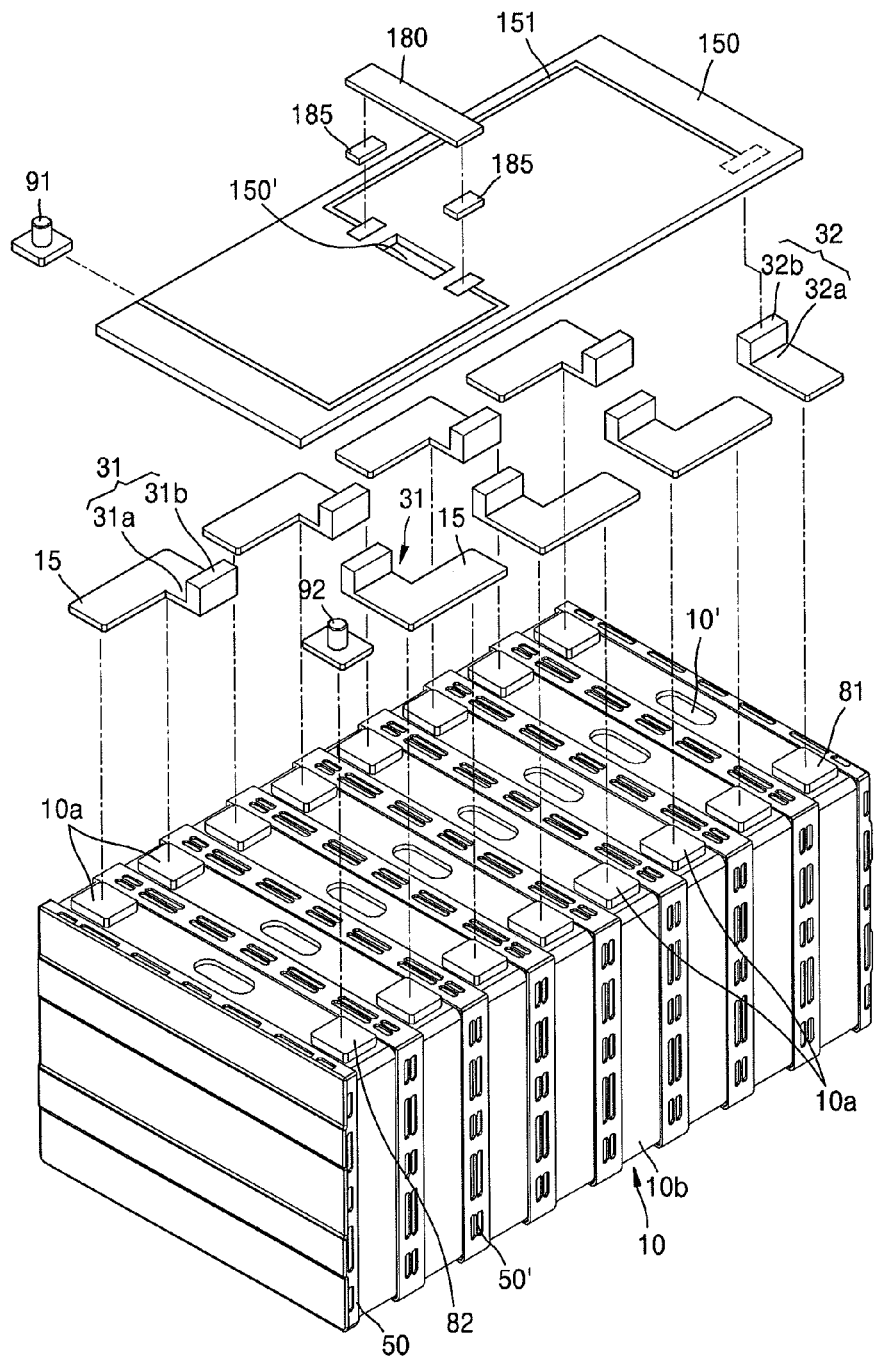
FIG. 1 illustrates an embodiment of a battery module.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

Figure 2:
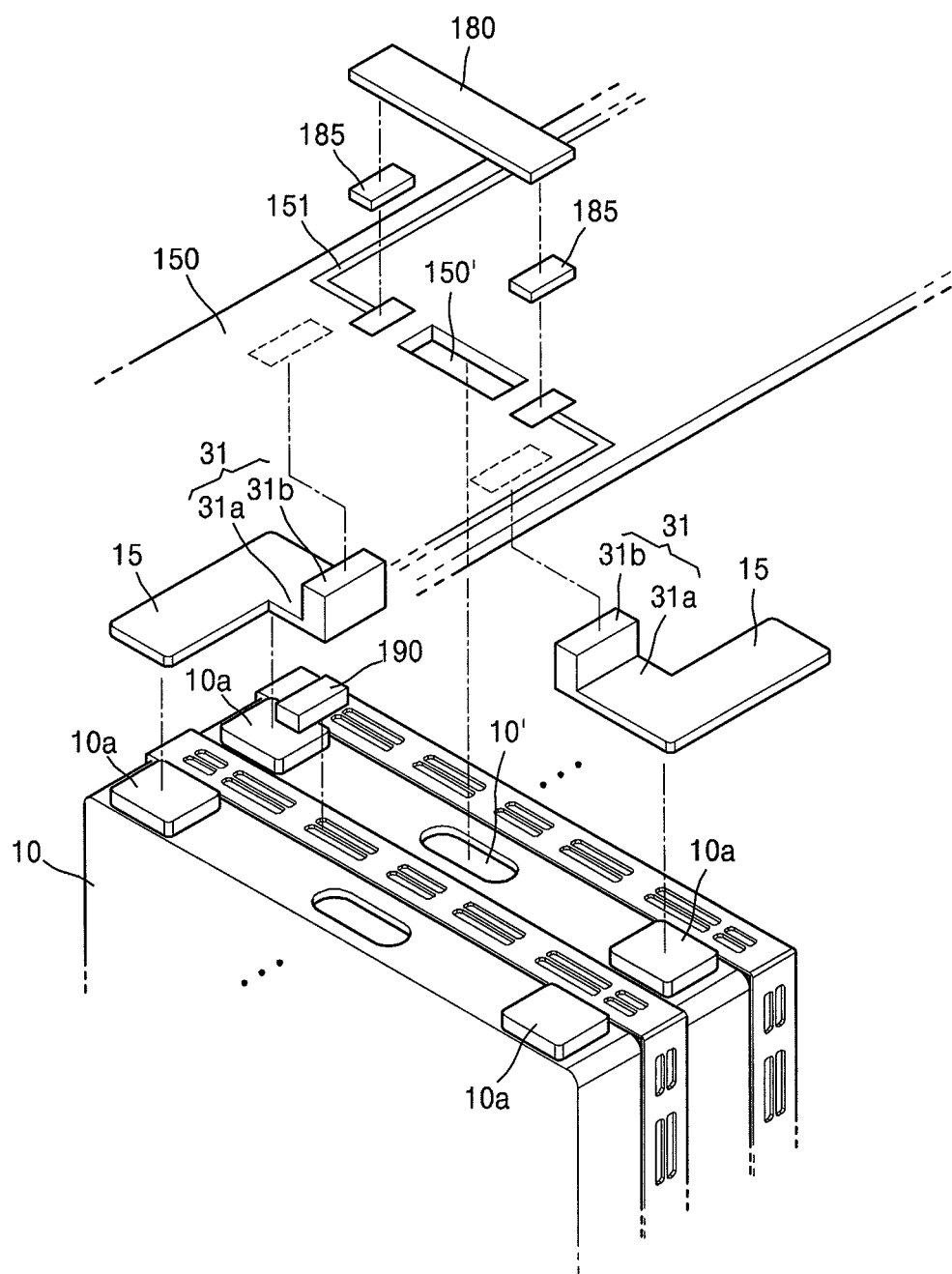
FIG. 2 illustrates an enlarged view of the battery module in FIG. 1.
Figure 3:
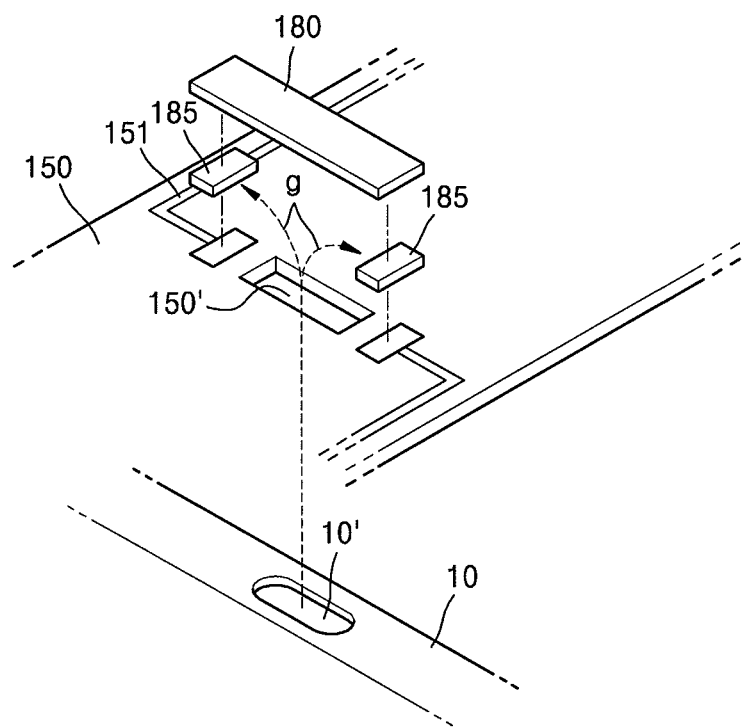
FIG. 3 illustrates an enlarged view of a portion in FIG. 2.
Figure 4:
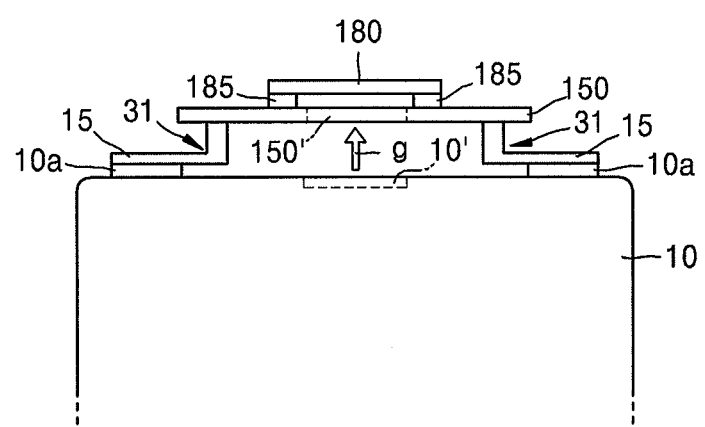
FIG. 4 illustrates a side view of the battery module in FIG. 3.

FIG. 1 illustrates an embodiment of a battery module, FIGS. 2 and 3 are enlarged views of a portion of the battery module in FIG. 1, and FIG. 4 is a side view of the portion of the battery module in FIG. 3.

Referring to FIGS. 1 to 4, the battery module includes a plurality of battery cells 10 arranged in one direction, and a protective circuit (e.g., circuit board) 150 electrically connected to the battery cells 10. In addition, the battery module may include wiring parts 31 and 32 on the battery cells 10 for electrically connecting the protective circuit 150 and the battery cells 10.

The battery cells 10 may be secondary battery cells such as but not limited to lithium ion battery cells. The battery cells 10 may have any one of a variety of shapes, e.g., cylindrical shape, prismatic shape, or another shape. The battery cells 10 may be any type of battery cell, e.g., polymer battery cells or another type.

Each of the battery cells 10 may include, for example, a case 10b, an electrode assembly in the case 10b, and electrode terminals 10a electrically connected to the electrode assembly and externally exposed from the case 10b. For example, the electrode terminals 10a may be exposed outside of the case 10b and may form portions of an upper side of the case 10b. The electrode assembly may include a positive electrode plate, a separator, and a negative electrode plate. The electrode assembly may be, for example, a jelly-roll or stacked-type electrode assembly. The case 10b accommodates the electrode assembly, and the electrode terminals 10a are exposed for electric connection with an external circuit.

The neighboring battery cells 10 may be electrically connected to each other, for example, by connecting electrode terminals 10a of the neighboring battery cells 10. For example, neighboring battery cells 10 may be electrically connected to each other, in series or parallel, by connecting electrode terminals 10a of the neighboring battery cells 10 using bus bars 15.

A safety vent 10' may be in the case 10b. The safety vent 10' may be relatively weak. As a result, the safety vent 10' may be fractured to release gas from inside of the case 10b when the internal pressure of the case 10b becomes equal to or higher than a set critical point.

Spacers 50 may be located between neighboring battery cells 10. The spacers 50 may insulate the neighboring battery cells 10 from each other. For example, the cases 10b of the battery cells 10 may have electric polarities, and the spacers 50 may be formed of an insulation material and disposed between the cases 10b to prevent electric interference between neighboring pairs of the battery cells 10. In addition, the spacers 50 may form gaps between the battery cells 10 as heat-dissipating paths. To this end, heat-dissipating holes 50' may be formed in the spacers 50.

The spacers 50 may be between the battery cells 10 to prevent thermal expansion (e.g., swelling) of the battery cells 10. The cases 10b of the battery cells 10 may be formed of a deformable material such as metal, and the spacers 50 may be formed of a less deformable material such as polymers in order to suppress swelling of the battery cells 10.

The wiring parts 31 and 32 include detection wiring parts 31 and a connection wiring part 32. The detection wiring parts detect state information such as voltages and temperatures of the battery cells 10. The connection wiring part 32 allow a charging/discharging current to flow therethrough. A charging/discharging current flowing through the connection wiring part 32 may be measured using, for example, a shunt resistor 180 or another type of sensor.

State information relating to the battery cells 10 obtained using the wiring parts 31 and 32 may be delivered to the protective circuit 150. The state information may be used as data for determining various abnormal states of the battery cells 10, such as overheating, overcharging, or overdischarging, or for checking operational states of the battery cells 10 such as charging and discharging states.

The detection wiring parts 31 may extend from the electrode terminals 10a of the battery cells 10 or the bus bars 15 connected to the electrode terminals 10a for collecting voltage detection signals from the battery cells 10. In the embodiment of FIG. 1, the detection wiring parts 31 may be protrusions protruding from the bus bars 15 toward the protective circuit 150. For example, the detection wiring parts 31 may be protrusions including extensions 31a integrally extending from the bus bars 15 and terminal portions 31b connected to a connection pattern of the protective circuit 150. In one embodiment, the detection wiring parts 31 may include extensions 31a that extend from the bus bars 15, and terminal portions 31b protruding upward from the extensions 31a toward the protective circuit 150. The terminal portions 31b may be connected to the connection pattern (denoted by a dashed line in FIG. 2) of the protective circuit 150.

In another exemplary embodiment, the detection wiring parts 31 may be flexible wires that include connectors provided on first ends for connection to the bus bars 15 and connectors on second ends for connection to the protective circuit 150.

The detection wiring parts 31 may measure voltages at a plurality of positions having different electrical potentials. For example, each detection wiring part 31 may be allocated to a pair of neighboring battery cells 10, and each pair of neighboring battery cells 10 may be electrically connected through one bus bar 15. Additionally, the detection wiring parts 31 are connected to the protective circuit 150. The protective circuit 150 may control charging and discharging operations of the battery cells 10 based on voltage detection signals collected through the detection wiring parts 31.

Referring to FIG. 2, thermistors 190 may be placed on the battery cells 10 for generating temperature detection signals. For example, the thermistors 190 may be between the battery cells 10 and the protective circuit 150, and the protective circuit 150 may push the thermistors 190 against the battery cells 10. In one embodiment, each thermistor 190 may be allocated to a pair of neighboring battery cells 10. For example, each thermistor 190 may be between the battery cells 10 and the protective circuit 150 across a pair of neighboring battery cells 10. Each thermistor 190 may generate a temperature detection signal for one battery cell 10 or two or more battery cells 10.

Temperature detection signals from the thermistors 190 are transmitted to the protective circuit 150. The thermistors 190 may be directly connected to a circuit board of the protective circuit 150. For example, in a state in which the thermistors 190 are coupled to the connection pattern of the protective circuit 150, the thermistors 190 may be on the battery cells 10 together with the protective circuit 150.

In another embodiment, the thermistors 190 may be indirectly connected to a circuit board of the protective circuit 150. For example, the thermistors 190 may be connected to the protective circuit 150 through additional detection wires. In this case, first ends of the detection wires may be connected to the thermistors 190, and second ends of the detection wires may be connected to the connection pattern of the protective circuit 150 for transmitting temperature detection signals.

Referring to FIG. 1, the wiring parts 31 and 32 may include the connection wiring part 32 in order to electrically connect a first output terminal 81 of the battery module and the protective circuit 150, and thus to form a charging/discharging current path. For example, the connection wiring part 32 may be a protrusion integrally extending from the first output terminal 81 or a second output terminal 82. For example, the connection wiring part 32 may include an extension 32a extending from the first output terminal 81, and a terminal portion 32b protruding upward from the extension 32a toward the protective circuit 150.

In another exemplary embodiment, the connection wiring part 32 may be a flexible wire including a ring terminal on a first end thereof for connection to the first output terminal 81, and a connector on a second end thereof for connection to the protective circuit 150.

The connection wiring part 32 may form a large current line through which a large amount of charging/discharging current flows. The detection wiring parts 31 may form small current lines for transmitting detection signals. For example, the connection wiring part 32 may have a wide sectional area to achieve a reduced resistance. The connection wiring part 32 may be formed on one of the first or second output terminals, which have different polarities.

The connection wiring part 32 forms the charging/discharging current path, and the shunt resistor 180 is placed in the charging/discharging current path. For example, the shunt resistor 180 may be on the protective circuit 150.

The shunt resistor 180 may be placed in the charging/discharging current path in order to measure a charging/discharging current and to generate a current detection signal. For example, the shunt resistor 180 may placed in a current path connected to the first output terminal 81 or the second output terminal 82. As shown in FIG. 2, a conductive pattern 151 (the charging/discharging current path) may be formed on the protective circuit 150 for allowing a charging/discharging current to flow therethrough. The shunt resistor 180 may be connected in the conductive pattern 151.

A charging/discharging current may be measured, for example, by detecting a voltage between ends of the shunt resistor 180. A voltage signal measured between the ends of the shunt resistor 180 may be amplified using an amplifying circuit.

In one embodiment, the charging/discharging current path extends from the first output terminal 81 to a first external terminal 91 through the connection wiring part 32 connected to the first output terminal 81, the conductive pattern 151 of the protective circuit 150, and the shunt resistor 180. The second output terminal 82 is connected to a second external terminal 92 directly or through one or more circuit devices. The first and second output terminals 81 and 82 may be an electrode terminal 10a of a first battery cell 10 and an electrode terminal 10a of a second battery cell 10. The first and second output terminals 81 and 82 may be electrically connected to the first and second external terminals 91 and 92 outside a case.

One of the first or second output terminals 81 and 82 (e.g., the first output terminal 81) is connected to the first external terminal 91 through the shunt resistor 180. The other of the first or second output terminals 81 and 82 (e.g., the second output terminal 82) is connected to the second external terminal 92, but not though the shunt resistor 180. A load may be connected between the first and second external terminals 91 and 92.

The protective circuit 150 may monitor charging and discharging states of the battery cells 10 (e.g., a charge state (charged amount) or an overcharge/overdischarge state) based on voltage detection signals collected through the detection wiring parts 31, temperature detection signals measured using the thermistors 190, and/or a current detection signal obtained using the shunt resistor 180. Then, the protective circuit 150 may control the charging and discharging operations of the battery cells 10 based on the monitoring.

Referring to FIG. 2, the shunt resistor 180 may be connected to the protective circuit 150 through one or more circuit breakers. The one or more circuit breakers may be, for example, one or more fusible conductors 185. For example, the shunt resistor 180 may be connected to the protective circuit 150 through by melting the fusible conductors 185 using a hot gas. In the exemplary embodiment, the fusible conductors 185 may include, for example, solder.

In one embodiment, the shunt resistor 180 are connected to the protective circuit 150 with the fusible conductors 185 therebetween. The shunt resistor 180 may be connected to the protective circuit 150, for example, by disposing the fusible conductors 185 between the shunt resistor 180 and the conductive pattern 151 (forming the charging/discharging current path) of the protective circuit 150, and fusing the fusible conductors 185. The fusible conductors 185 may be heated and melted by a hot gas discharged from the battery cells 10. For example, when gas is removed from the battery cells 10 (degasing), the fusible conductors 185 forming the charging/discharging current path may be melted. As a result, the charging/discharging current path may be cut.

This occurs, for example, when the internal pressure of one or more of the battery cells 10 increases to a set critical point or higher, because gas is accumulated in the battery cell 10. When this happens, the safety vent 10' of the battery cell 10 is fractured and the accumulated gas is discharged to the outside. In FIG. 3, the discharge of gas is illustratively denoted by g.

When gas is accumulated in the battery cells 10, the battery cells 10 may swell. As a result, the possibility of a negligent accident (e.g., an explosion) may increase. When the internal pressure of one or more of the battery cells 10 increases to the set critical point or higher, the safety vent 10' of the battery cell 10 is fractured and gas in the battery cell 10 discharges to the outside.

Then, in response to the gas discharging event (degasing event) of the battery cell 10, the charging/discharging current path is cut. This will prevent an accident that may occur during a charging or discharge operation of the battery cell 10 having a high internal pressure. When the charging or discharging of the battery module is interrupted as described above, a user may check the battery module and replace the battery cell 10 having the fractured safety vent 10'.

As shown in FIGS. 3 and 4, the shunt resistor 180 may be placed above the safety vent 10'. For example, the shunt resistor 180 may be placed at a position at which the shunt resistor 180 may be heated by gas discharged from a safety vent 10'. In this case, the fusible conductors 185 connecting the shunt resistor 180 may be melted by the heat of discharged gas. In FIGS. 3 and 4, the discharge of gas is denoted by g.

Under some circumstances, the fusible conductors 185 may not be fully melted, but only partially melted, by the gas. In this case, the electrical connection between the shunt resistor 180 and the protective circuit 150 may still be cut as a result of melting of the fusible conductors 185. For example, the charging/discharging current path may be cut or disrupted in response to fracturing of a safety vent 10'.

When this occurs, gas may be discharged through the safety vent 10', and the pressure of this gas discharge may cut the fusible conductors 185.

In the exemplary embodiment, the shunt resistor 180 may be disposed directly above a safety vent 10'. For example, as shown in FIGS. 3 and 4, the shunt resistor 180 may be placed to face a safety vent 10' through an opening 150' of the protective circuit 150. The opening 150' may be formed through the protective circuit 150, and the fusible conductors 185 may be disposed around the opening 150'. Then, the shunt resistor 180 may be placed on the fusible conductors 185 to cover the opening 150'.

Since the fusible conductors 185 connect the shunt resistor 180 to the charging/discharging current path (the conductive pattern 151), when the fusible conductors 185 are melted, the shunt resistor 180 may be disconnected. As a result, the charging/discharging current path may be broken.

Referring to FIG. 1, the battery module includes the battery cells 10 arranged in one direction. In the exemplary embodiment, the shunt resistor 180 may be placed directly above a predetermined (e.g., central or another internal) battery cell 10 of the battery module. For example, the shunt resistor 180 may be placed directly above one of the battery cells 10 of the battery module which is most likely to discharge gas, so as to safely cut the charging/discharging current path when gas is discharge from the battery cell 10.

In one embodiment, the shunt resistor 180 is disposed directly above the central battery cell 10 of the battery module because the central battery cell 10 has a relatively high possibility of heat accumulation. For example, battery cells 10 at the sides of the battery module may be likely to make contact with ambient air having a relatively low temperature, or may not be likely to discharge gas due to thermal runaway or transfer because each of the battery cells 10 disposed at the sides of the battery module has a neighboring battery cell 10 only on one side.

Therefore, when the shunt resistor 180 is directly above the central battery cell 10, which has a relatively high possibility of heat accumulation and gas discharge, a gas discharge event may be accurately detected and the charging/discharging current path may be cut in a timely manner. Thus, the shunt resistor 180 may be located directly above the central battery cell 10 to detect a gas discharge event and cut the charging/discharging current path without failure.

As described with reference to FIG. 3, the shunt resistor 180 is disposed directly above the safety vent 10' of the central battery cell 10 and coupled to the protective circuit 150, with the fusible conductors 185 therebetween. The shunt resistor 180 may directly face the safety vent 10' through the opening 150' of the protective circuit 150. In other exemplary embodiments, an opening may not be formed through the protective circuit 150. Even in this case, gas discharged through the safety vent 10' may melt the fusible conductors 185 on the protective circuit 150, and thus the charging/discharging current path may be cut as the fusible conductors 185 are melted.

By way of summation and review, the battery cells in a battery module are closely arranged. As a result, when a battery cell deteriorates or gas is generated, neighboring battery cells may deteriorate and/or the safety of the battery module may be markedly reduced, for example, because of thermal runaway. Thus, the occurrence of negligent accidents becomes a possibility.

In accordance with one or more of the aforementioned embodiments, the charging/discharging current path of a battery module may be cut in response to a gas discharge from the inside of the battery cells 10, without failure.

Therefore, accidents may be prevented and thus the battery module may be safely used. In addition, since a safety structure for detecting a gas discharge event and cutting a charging/discharging current path is realized using the shunt resistor used to measure current, additional structural changes or costs may not be necessary and the lifespan of the battery may be increased.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A battery module, comprising:
   at least one battery cell;
   a shunt resistor above a safety vent of the battery cell, the shunt resistor to measure a charging/discharging current of the battery cell; and
   at least one fusible conductor connecting the shunt resistor to a charging/discharging current path, the at least one fusible conductor including a material which melts when heated by a gas discharged through the safety vent.

2. The battery module as claimed in claim 1, further comprising:
   a protective circuit between the battery cell and the shunt resistor.

3. The battery module as claimed in claim 2, further comprising:
   a conductive pattern on the protective circuit and including the charging/discharging current path, wherein the at least one fusible conductor connects the shunt resistor to the conductive pattern.

4. The battery module as claimed in claim 2, wherein the protective circuit includes:
   a circuit board including an opening,
   wherein the shunt resistor directly faces the safety vent through the opening.

5. The battery module as claimed in claim 4, wherein the at least one fusible conductor is adjacent to the opening.

6. The battery module as claimed in claim 2, wherein:
   the battery module includes first and second battery cells,
   the first and second battery cells include first and second output terminals having opposite polarities, and
   a connection wiring is connected to the protective circuit to conduct a charging/discharging current from the first or second output terminal.

7. The battery module as claimed in claim 6, wherein the connection wiring includes a protrusion integrally protruding from the first or second output terminal toward the protective circuit.

8. The battery module as claimed in claim 2, wherein detection wiring is connected to the protective circuit for collecting a voltage detection signal from the battery cell.

9. The battery module as claimed in claim 8, wherein the detection wiring extends from a bus bar electrically connecting a plurality of battery cells.

10. The battery module as claimed in claim 9, wherein the detection wiring includes a protrusion integrally protruding from the bus bar toward the protective circuit.

11. The battery module as claimed in claim 1, wherein the at least one fusible conductor includes solder.

\* \* \* \* \*